Figure 1:
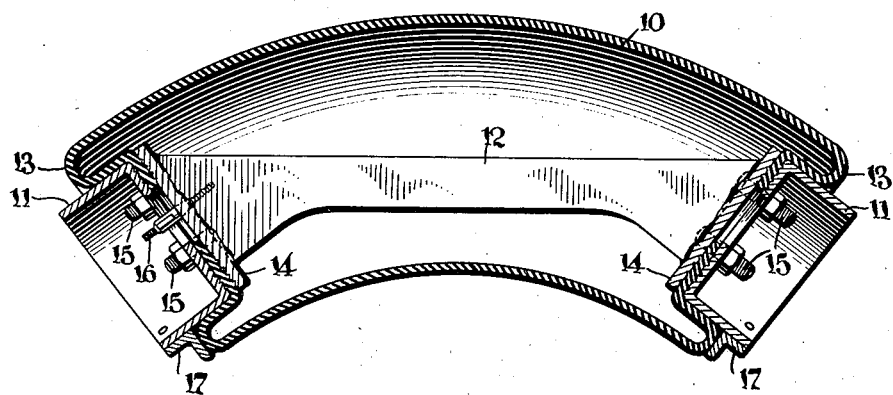

July 10, 1928.

R. S. BURDETTE

SECTIONAL AIRBAG

Original Filed April 10, 1925

1,676,817

INVENTOR
Richard S. Burdette,
BY

ATTORNEY

Patented July 10, 1928.

1,676,817

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

SECTIONAL AIRBAG.

Original application filed April 10, 1925, Serial No. 22,205. Divided and this application filed January 19, 1927. Serial No. 162,049.

My invention relates to cores employed in the vulcanization of pneumatic tire casings and it has particular relation to cores of the inflatable sectional type, suitable for use in repairing short sections of such casings.

One object of my invention consists in providing a novel type of flexible vulcanizing core composed of a relatively small amount of light-weight material so distributed that it is adapted to withstand relatively great internal pressure.

Another object of my invention is to provide a flexible sectional core in which undesirable effects of unbalanced internal stresses caused by an arcuate contour of the core are obviated.

Another object of my invention consists in providing a sectional vulcanizing core consisting of a metallic member and a replaceable inflatable rubber and fabric portion.

My invention relates particularly to pneumatic cores of the sectional so-called "airbag" type. In the repair of pneumatic casings, it is necessary to vulcanize the uncured rubber used in the repair in order to give to the repaired portion a toughness and strength comparable with the other portions of the casing. In vulcanizing a tire casing the defective portions are removed, raw rubber or rubber and fabric is inserted in place thereof, and the repaired casing is placed within a metallic mold having a recess which conforms to the contour of the outer surface of the casing. Within the casing is inserted an inflatable pneumatic core or airbag which is of substantially the same diameter as the inner periphery of the casing and of slightly greater length than the repaired portion of the casing. The mold in which the casing is placed is heated and the airbag is inflated so as to hold the repaired portion of the casing in contact with the mold under the desired pressure. If desired, the airbag may be heated by inflating it with either steam or hot water.

Heretofore it has been common practice to construct airbags of this character solely of rubberized fabric. One objection to this type of airbag has been that, although the walls of the bag are reinforced by contact with the inner surface of the tire casing and are therefore not subjected to any injurious stresses, nevertheless, the end portions thereof are totally unsupported and are subjected to the same pressure as are the walls of the bag. As the pressure necessary properly to cure a repaired casing is reasonably high, the total force development in an airbag of large diameter, such as a truck tire or balloon tire bag, is very great. In order to prevent injury to the bag, it is necessary to reinforce the ends thereof by the addition of layers of reinforcing material. Also, in order to provide proper anchorage for these reinforcing ends, it is necessary to make the side walls of heavier material than would otherwise be necessary. Another objection to this type of bag is that, owing to the difference in the length of the outer periphery and the inner periphery of the bag, and the fact that the ends thereof are disposed at a considerable angle to each other, certain unbalanced stresses are produced therein which tend to deform the bag. A still further objection to this type of bag is that, as the bag is unitary, when any one portion of the bag fails, the entire bag is rendered useless.

By my invention. I have obviated these objections by providing a centrally disposed supporting member which substantially practically avoids the undesirable effects of the unbalanced forces developed in the bag, which reduces the stress exerted upon the end of the bag and assumes a portion of the reduced stress, and which permits of the replacement of those portions of the bag which may fail under ordinary working conditions.

Figure 2:
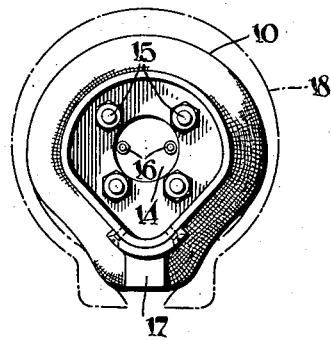

For a more thorough description of my invention, reference may now be had to the accompanying drawings, of which;

Fig. 1 is a longitudinal cross-sectional view of an inflatable vulcanizing device constructed in accordance with my invention; and Fig. 2 is an elevational view of one end of the device illustrated in Fig. 1.

A practical embodiment of my invention illustrated in the drawings includes a cylindrical arcuate flexible member 10 provided with metallic ends 11 of cup-shape, which are mounted upon opposite ends of a metallic bracing member 12, disposed centrally within the member 10. These elements constitute what I term a "vulcanizing core". As illustrated, the cup-shape ends 11, as well as the flexible member 10, are pear-shape in cross-section, although the cross-sectional contour may be varied to assume any desired shape, such as circular or elliptical. The member 10 is of such length with respect to the member 12 that at its end portions 13, it folds over or overlaps the cup-shape member 11. The ends 13 of the flexible member 10 are clampingly engaged between the cup-shape member 11 and a metallic plate 14, mounted upon the member 12, by means of suitable bolts 15. In order to provide an air-tight connection between the ends 13 and the member 11, the two opposed faces of the members 11 and 14 are serrated at the location where they engage the end of the member 10. Suitable valves 16 are mounted in one of the members 14 in order to provide for the admission and escape of a suitable inflating and heating medium.

The member 11 is provided with a supporting member 17 which serves to engage the mold intermediate the tire beads so as to prevent the exertion of undue stresses upon the beads of the tire casing or upon the inner surface of the airbag by reason of the unbalanced forces caused by the arcuate contour of the bag. In this embodiment of my invention, it will be observed that the greater portion of the end thrust of the bag is assumed by the metal end members 11 and the bracing member 12 so that only a small percentage of the total thrust is assumed by the end portions 13 of the flexible bag.

From the foregoing description, it will be apparent that I have provided a novel type of flexible core in which the strains are so reduced and distributed that relatively high pressures may be employed without detriment to a bag composed of a relatively small quantity of relatively light-weight fabric. It will also be apparent that by the provision made for the elimination of the unbalanced forces, the life of the bag will be materially prolonged and the possibility of injury to casings being cured by the airbag will be eliminated. It will be further apparent that the life of a bag of the character described will be greater than that of the old type of bag owing to the fact that the thinner flexible walls may be subjected to flexing with less injury thereto than is incident to the flexing of a bag having thicker walls. Furthermore, when the flexible member has become impaired, it is replaced, the life of the metallic portions of the bag being indefinite and materially greater than that of the rubber portions.

Although I have illustrated but one form which my invention may assume and have described in detail but a single application thereof, it will be apparent to those skilled in the art that it is not so limited but that various minor modifications and changes may be made therein without departing from the spirit of my invention, or from the scope of the appended claims.

What I claim is:

1. A fluid container adapted to be supported within a tire casing comprising an elongate flexible member of substantially pear-shape cross-section, and a rigid member extending through said flexible member and connected thereto adjacent each end of the flexible member, the latter formed with folded end portions supported against the contiguous end portions of the rigid member.

2. A fluid container adapted to be supported within a tire casing comprising an elongate flexible member of substantially pear-shape cross-section, a rigid member extending through said flexible member and connected adjacent each of its ends to the end of the flexible member, the latter being formed with folded end portions supported against the contiguous end portions of the rigid member and a block secured to the rigid member for relieving pressure between the flexible member and the tire casing beads.

3. A fluid container adapted to be supported within a tire casing comprising a flexible member and an elongate rigid member together forming a closed container, the flexible member including folded portions supported against the ends of the rigid member, and inlet and outlet connections secured to the rigid member for conveying fluid under pressure.

4. A vulcanizing core adapted to be supported within a tire casing comprising a flexible member and a rigid member together forming a closed container, the rigid member comprising an elongate metal member provided at each end with a metallic member of substantially pear-shape cross-section, the flexible member enclosing the rigid member and provided with folded end portions adapted to be flexed along said peripheral surface, and connections in the rigid member adapted to convey fluid under pressure.

5. A vulcanizing core adapted to be supported within a tire casing comprising a flexible member and a rigid member together forming an elongate closed container, and abutment means adjacent each end of the container for relieving pressure of the flexible member against the tire beads.

6. A vulcanizing core adapted to be supported within a tire casing comprising a flexible member and a rigid member together forming an elongate closed container, and an abutment at each end of the container secured to the rigid member for relieving unbalanced radial forces tending to press the core against the beads of the tire casing.

7. A vulcanizing core adapted to be disposed within a pneumatic tire casing comprising an outer segmental arcuate expansible member of tubular formation having folded end portions, and a rigid support for the expansible member, the folded end portions being disposed circumferentially of the rigid support and movable with respect thereto.

8. A vulcanizing core comprising a flexible elongate arcuate container and a metal end member so connected thereto that an annular fold of the container at least partially surrounds the end member.

9. A fluid container adapted to be supported within a tire casing comprising an elongate flexible member and a rigid member extending through the flexible member and connected thereto adjacent each end of the flexible member, the latter being formed with folded end portions supported against the contiguous end portions of the rigid member.

10. A fluid container adapted to be supported within a tire casing comprising an elongate flexible member, a rigid member extending through the flexible member and connected adjacent each of its ends to the end of the flexible member, the latter being formed with folded end portions supported against the contiguous end portions of the rigid member and means secured to the rigid member for relieving pressure between the flexible member and the tire casing beads.

In witness whereof, I have hereunto signed my name.

RICHARD S. BURDETTE.